Oct. 29, 1968  J. P. MOORE  3,408,095
SWIVEL JOINTS
Filed March 21, 1966  3 Sheets-Sheet 1
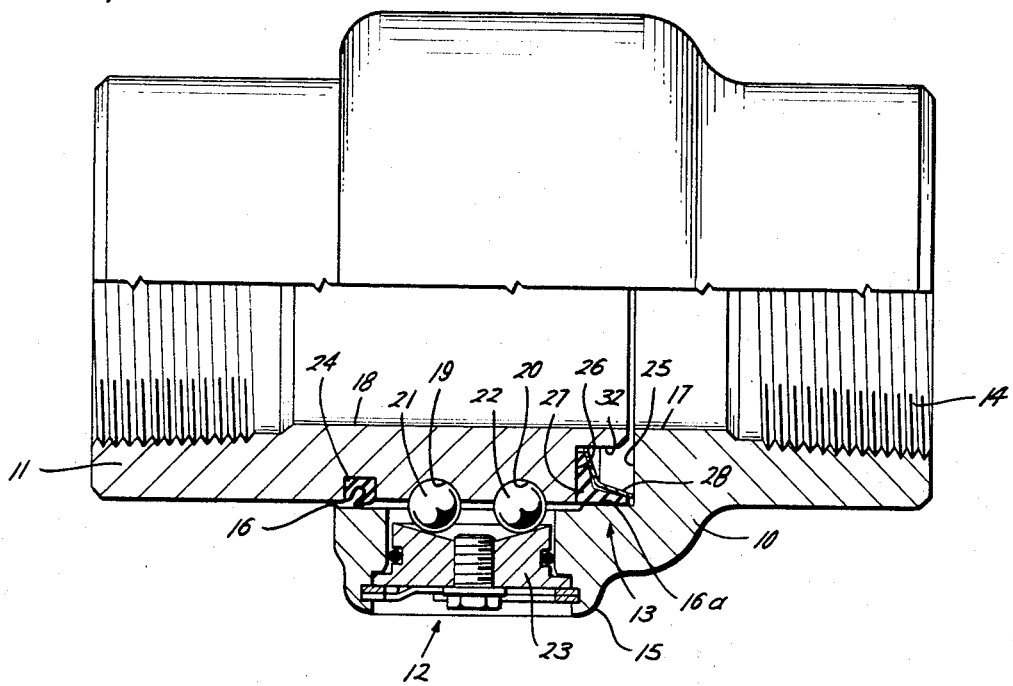
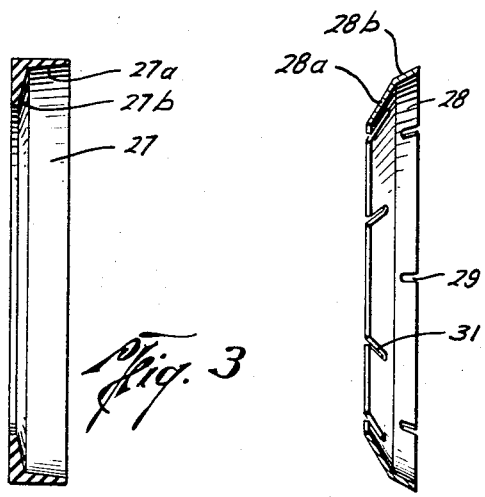
Joe P. Moore
INVENTOR.
BY J. Vincent Martin
Jas. E. Edwards
M. H. Gay
ATTORNEYS Oct. 29, 1968  J. P. MOORE  3,408,095
SWIVEL JOINTS
Filed March 21, 1966  3 Sheets-Sheet 2
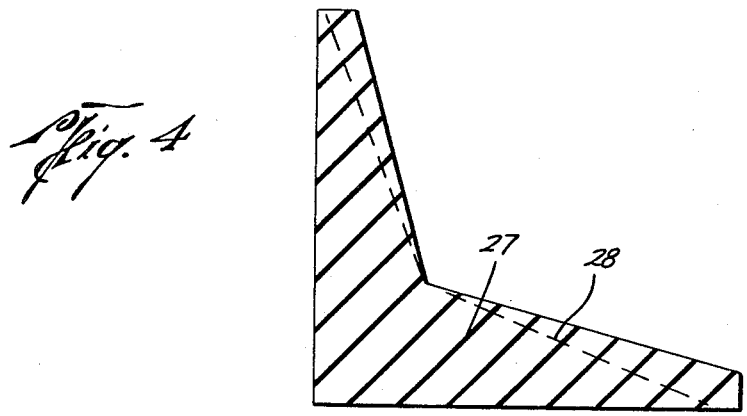
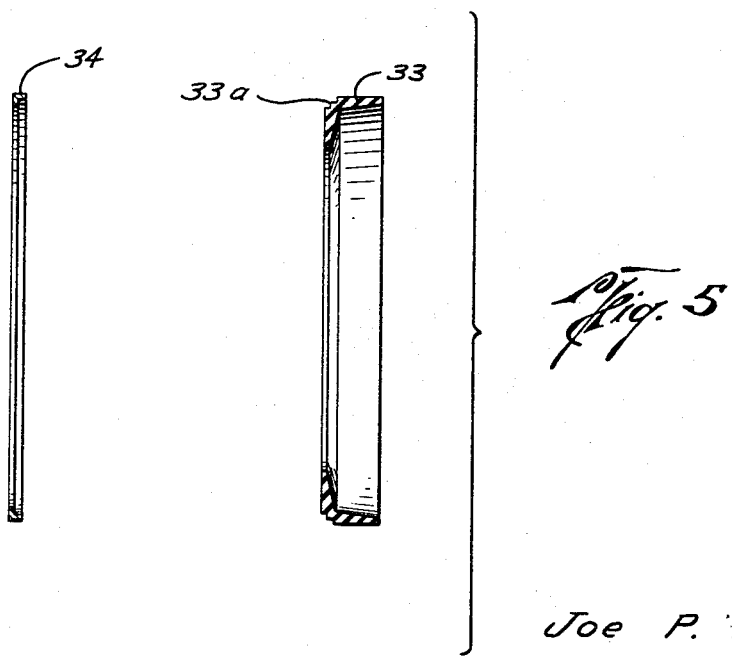
Joe P. Moore
INVENTOR.
BY J. Vincent Martin
Jas. E. Edwards
M. H. Gay
ATTORNEYS Oct. 29, 1968
J. P. MOORE
3,408,095
SWIVEL JOINTS
Filed March 21, 1966
3 Sheets—Sheet 3
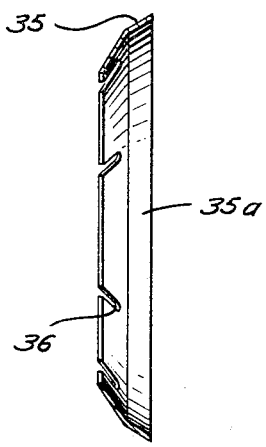
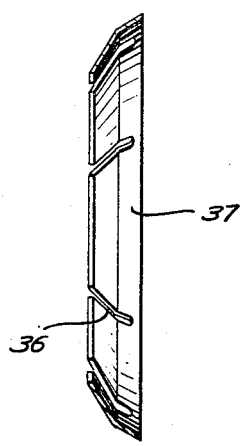
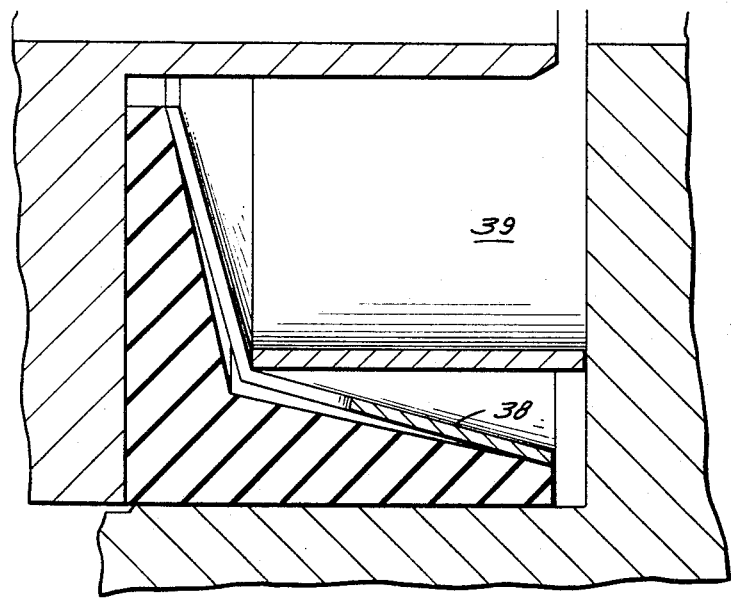
Joe P. Moore
INVENTOR.
BY *J. Vincent Martin*
*Joe E. Edwards*
*M. N. Gay*
ATTORNEYS United States Patent Office 3,408,095
Patented Oct. 29, 1968

3,408,095
SWIVEL JOINTS
Joe P. Moore, Richardson, Tex., assignor to The Youngstown Sheet and Tube Company, Youngstown, Ohio, a corporation of Ohio
Filed Mar. 21, 1966, Ser. No. 535,897
7 Claims. (Cl. 285—110)

ABSTRACT OF THE DISCLOSURE

A swivel joint having ball bearings providing for rotation of the nipple and body and a nonresilient seal member held in sealing engagement by an expander ring.

---

This invention relates to swivel joints.

Swivel joints of many different types have been proposed in the past which, in order to obtain good sealing characteristics, have utilized rubber to seal between the relatively rotatable parts. Rubber or synthetic rubber has many excellent characteristics for this service. It has, however, a number of disadvantages. One disadvantage is its relatively high coefficient of friction, and designs have been proposed in which plastics such as Teflon (a polytetrafluoroethylene resin) have been used for their low friction characteristics. However, Teflon and other similar plastics are not resilient, and a resilient means has been utilized to hold the Teflon seal element in sealing position. See, for instance, the patents to Faccou, 2,906,548, and Buckner, 3,011,803. This design continues to have the disadvantage of using a rubber element (rubber when used herein refers to either natural or synthetic rubber) which deteriorates with age, under the influence of many fluids, and which cannot be used in extreme heat or cold service.

It is an object of this invention to provide a swivel joint which does not require the use of rubber seal assemblies.

Another object is to provide a swivel joint which may use a nonrubber material such as Teflon which will flow under pressure in which the seal compartment is not filled with material and in which the nonrubber material is confined and held against the surfaces to be sealed between.

Another object is to provide a swivel joint for use in extreme cold service where shrinkage of the seal member is resisted by the same element that holds the seal member in sealing position.

Another object is to provide a swivel joint wherein an annular L-shaped in radial cross section nonrubber seal member has the ends of the L held in sealing position to act as a lip-type seal.

Another object is to provide a swivel joint wherein an annular L-shaped in radial cross section nonrubber seal member and a similarly shaped expander member are used and a space is provided between the central section of the seal and expander to eliminate the need for fine tolerance, and the force exerted by the expander tends to flow the seal member into the space.

Another object is to provide a swivel joint for use in extreme heat or cold service, and with many fluids which are deleterious to rubber, which is simple and inexpensive to manufacture.

Another object is to provide a swivel joint in which the seal member is a plastic material having a low coefficient of friction held in sealing position by a metallic expander which urges the plastic into sealing engagement with the surfaces sealed between.

Another object is to provide a swivel joint in which only substantially inert materials are used in the seal assembly.

Other objects, features and advantages of the invention will be apparent from the drawings, the specification and the claims.

In the drawings, wherein like parts are indicated by like numerals, and wherein illustrative embodiments of this invention are shown:

FIGURE 1 is a view in quarter-section through a swivel joint constructed in accordance with this invention;

FIGURE 2 is a view in radial cross section through the expander utilized in FIGURE 1;

FIGURE 3 is a view taken in radial cross section through the seal member utilized in FIGURE 1;

FIGURE 4 is a radial sectional view through the seal member illustrating its position when relaxed and in dashed lines the expander member when relaxed;

FIGURE 5 is an exploded view of an alternate form of seal member;

FIGURE 6 is a view in radial cross section through an alternate form of expander;

FIGURE 7 is a view in radial cross section through a further alternate form of expander; and, FIGURE 8 is a fragmentary sectional view through the seal assembly portion of the swivel joint illustrating a modified form of this invention.

The swivel joint illustrated in FIGURE 1 includes first and second tubular conduit elements provided by the body 10 and the nipple 11 joined together in end-to-end relationship for relative rotation by the connecting means indicated generally at 12. The seal assembly for sealing between the two conduit elements is indicated generally at 13.

The body 10 is provided with any conventional means for attachment to a conduit, such as threads 14. The body is provided with a bell section 15 which has a bore 16 therein. A counterbore 17 completes the flowway through the body.

The nipple 1 is dimensioned to telescope into the bore 16 of the body and has a bore 18 extending therethrough which aligns with bore 17 in the body to complete the flowway through the swivel joint.

The means for connecting the nipple and body together for relative rotation may take any conventional form such as the pair of ball races 19 and 20 in the nipple which cooperate with similar ball races (not shown) in the body and the balls 21 and 22 to provide for relative rotation while preventing axial movement. The plug 23 provides for feeding of the balls into the ball races, and the plug may take any conventional form. A dust seal 24 is provided in conjunction with the ball assembly to exclude dust from the bearing assembly.

In accordance with this invention, a seal assembly chamber is provided which has relatively rotating surfaces which are to be sealed between. In addition to at least two relatively rotating surfaces, the chamber provides a third surface which is utilized to hold the expander in seal-expanding position. In the illustrated form of the invention, the bore 16 provides at 16a a circumferential annular surface which is coaxial with the rotational axis of the conduit elements and provides one of said three surfaces. The other two surfaces are provided by the confronting surfaces 25 and 26 on the body 10 and nipple 11, respectively. With this arrangement, it will be appreciated that the relatively rotating surfaces 26 and 16a are the two surfaces to be sealed between. It is not necessary that the surface 16a be a cylinder coaxial with the axis of rotation, or that the surface 26 lie in a plane perpendicular to the axis of rotation. It will be appreciated that one or both of these surfaces might be at different angles and in one form of swivel joint in which this invention has been employed, the surface 26 extends at an angle to a plane perpendicular to the rotational axis of the nipple 11.

In accordance with this invention, the seal between the relatively rotating surfaces is provided by an L-shaped in cross section annular member 27. This seal ring is made of a flexible material and is not made of rubber, that is, natural rubber or synthetic rubber. Preferably the seal is made from a plastic which will withstand both low and high temperature conditions and will be inert to the fluid which is to pass through the swivel. Preferably the seal is Teflon, as this material is inert to many fluids and will withstand both low and high temperature conditions. As shown, the OD (outer diameter) leg of the seal engages the circumferential surface 16a and the ID (inner diameter) leg engages the surface 26.

Means are provided for holding the two legs of the seal member in contact with the surfaces they engage and for confining the seal material. It will be noted that the seal chamber is much larger than the seal member and the seal member is confined between the surfaces 16a and 26 and the expander means 28. The expander means is provided by a ring 28 which is generally L-shaped in radial cross section. The expander is a nonrubber material having resilient characteristics. The exterior surfaces, that is surfaces 28a and 28b of the expander ring, are formed on an obtuse angle so as to engage the internal surfaces 27a and 27b of seal 27. To provide for resiliency in the expander, a plurality of slots 29 and 31 are cut in ring 28. Thus, with the expander ring held firmly against the seal ring 27, the resilient expander ring will urge the seal ring into contact with the surfaces 16a and 26.

In order to confine the seal ring, to provide lip-type seals at the ends of the legs of the seal ring, and to eliminate the need for fine tolerances in manufacture, the exterior surface of the expander ring is so formed relative to the interior surface of the seal ring that when in the relaxed position the expander ring engages only the outer portions of the legs of the seal ring to thus provide a gap at the apex of the expander and seal rings. For simplicity in manufacture, this feature is provided by having flat surfaces on the seal ring and expander ring. The outer surface of the expander ring is formed on an obtuse angle which is slightly greater than the obtuse angle of the inner surface of the seal ring. That is, the obtuse angle formed by surfaces 28a and 28b is greater than the angle formed by the surfaces they contact on the seal member.

The above relationship is illustrated in FIGURE 4 where the seal ring 27 is shown in its relaxed condition and the expander ring 28 is shown in dashed lines in relaxed condition. It will be appreciated that when the parts are assembled and the expander ring is urged toward the seal ring, the seal ring will tend to flow toward its apex. As shown in FIGURE 1, it is preferred that under atmospheric conditions there still remains a slight gap between the seal ring and expander at the expander apex which is filled up due to pressure of the fluid within the joint when in service. This gap is of course not necessary, but the relationship is preferred as it insures that the expander will be acting on the outboard extremities of the legs of the seal member to hold them in position and to provide a lip-type seal.

The expander may be made in any desired shape so long as it is generally L-shaped on its outer surface to generally conform to the L-shaped annular seal. The expander may be made from any desired nonrubber material, and is preferably made from a material such as steel, stainless steel, or the like.

In order to hold the expander ring in firm contact with the seal ring, means are provided which engage one of the three surfaces referred to hereinabove and hold the expander ring in firm contact with the seal ring. In its simplest and preferred form, this means for holding the expander ring in engagement is an extension of the outboard leg of the expander means 28. As shown in FIG. 1, the outboard leg has a sufficient dimension that it extends beyond the seal member and engages the surface 25. The dimensions are such that when the nipple is properly positioned within the body, the surface 25 engages expander ring 28 and forces it firmly into engagement with both legs of the seal ring 27.

To avoid tolerance problems, the outboard leg of the seal member is shown to be spaced from this surface 25, but it will be appreciated that this is not necessary.

It might be noted that the expander 28 holds the seal ring in position with sufficient firmness to permit the joint to be used for vacuum as well as for pressure service. If desired, the seal could be turned around and seal between surface 25 and surface 32 for vacuum service.

With the assembly of FIGURE 1, it will be appreciated that relative rotation will occur between the seal ring 27 and surface 26. Preferably, the leg of the seal member 27 engaging surface 26 is made slightly shorter than the other leg and this arrangement, plus the engagement of the expander 28 against surface 25 of the body, will hold the seal against rotation relative to the body 10.

The retainer 28 is bearing upon the seal member 27 along surfaces which incline toward the apex of the retainer. Thus, there is a force component on the seal member tending to flow the seal member from the extremity of its legs toward its center section, and the retainer thus will readily confine the seal member.

In FIGURE 5 there is shown a seal member 33 which may be substituted for seal member 27. This seal member is generally identical with seal 27 except that it is notched at its apex as shown at 33a and a rigid retainer 34 fits into the notch 33a. This retainer 34 will prevent the seal material from being extruded into the gap between surfaces 16a and 26 under high pressure service.

Under extreme cold conditions some seal material, such as Teflon, will tend to shrink to a greater degree than the steel of the body 10. To conteract this tendency of the seal to shrink away from surface 16a, a modified form of expander 35 such as shown in FIGURE 6 may be utilized. It will be noted that the expander is slotted at 36 and that these slots open to the ID leg of the expander only. The OD leg 35a is solid. If more resiliency is desired than shown in the FIGURE 6 form of the expander, a further modification may be utilized such as the expander 37 shown in FIGURE 7. Here the slots 36 begin at the ID leg of the expander and extend through a portion of the OD leg of the expander. The extremity of the OD leg, however, is continuous to provide support for the outer extremity of the OD leg of the seal means and resist its pulling away from surface 16a.

FIGURE 8 illustrates a modified form of this invention in which the expander means and the means for holding the expander in engagement with the seal are separate elements. The body and nipple, as well as the seal ring, are identical. The expander ring 38 has its OD leg slightly shorter than the expander ring 28 so that it does not engage surface 25. A separate cylindrical expander means 39 is provided which engages the expander ring 38 and the surface 25 to hold the expander ring in expanded position. The ring 39 may be completely separate from the expander ring 38, or it may be attached thereto as by spot-welding if desired.

From the above it will be seen that all of the objects of this invention have been attained. A swivel joint has been provided which eliminates the necessity of using rubber, synthetic rubber, or like materials which do not function well in heat or cold and are not inert to many fluids. A joint has been provided in which Teflon or similar material may be used as the seal member even though it is not resilient. The seal assembly is very simple and inexpensive to fabricate. By virtue of the particular design, and in particular the providing of the space between the seal member and the apex of the expander, tolerance control provides no problem in manufacture.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A swivel joint comprising,
a pair of tubular conduit elements,
means connecting the elements together for relative rotation,
a generally L-shaped in radial cross section annular nonresilient seal means sealing between said elements and having one leg engaging a surface on one conduit element and the other leg engaging a surface on the other conduit element,
a generally L-shaped in radial cross section resilient metallic annular expander means having its exterior surface formed on an obtuse angle with its legs engaging said legs of said seal means and urging said legs of said seal means toward said surfaces,
and means engaging a third surface on one of said conduit elements which extends transverse of the axis of rotation of the elements and holding said expander means in engagement with both legs of said seal means, the exterior surface of said expander formed on an angle greater than the interior surface of said seal means to urge the seal means to flow toward the apex of its L-shape, said resilient ring in engagement with said seal ring over the major portion of the exterior surface of the resilient ring.

2. The swivel joint of claim 1 wherein the engaging and holding means is a continuation of one leg of the expander means.

3. The swivel joint of claim 1 wherein the engaging and holding means is a separate member extending between the expander means and said third surface.

4. The swivel joint of claim 1 wherein the expander means is a resilient metallic member slotted at radially spaced points.

5. The swivel joint of claim 1 wherein the expander means is a resilient metallic member slotted at radially spaced points beginning at the radially inner extremity of the expander, the radially outer extremity of the expander being continuous and relatively rigid to prevent contraction of the seal means under low temperature conditions.

6. The swivel joint of claim 1 wherein when the joint is assembled and under atmospheric pressure the apex of the expander means is spaced from the seal means.

7. A swivel joint comprising,
first and second tubular conduit elements,
means connecting the elements together in end-to-end relationship for relative rotation,
an annular circumferentially extending surface coaxial with the rotational axis of said elements and a pair of confronting annular surfaces on said elements extending generally transverse to the rotation axis of said elements with one of said annular surfaces on each element,
a generally L-shaped annular seal ring of flexible nonresilient material having its radially outer leg engaging said annular surface and its radially inner leg engaging one of said confronting surfaces.
an annular generally L-shaped resilient metallic ring clamped between said seal ring and the other of said confronting surfaces and engaging both the radially inner and radially outer legs of said seal ring to urge the radially outer leg against said circumferentially extending surface and the radially inner leg against said other confronting surface, the exterior surface of said expander formed on an angle greater than the interior surface of said seal means to urge the seal means to flow toward the apex of its L-shape, said resilient ring in engagement with said seal ring over substantially the entire exterior surface of the resilient ring.

References Cited

UNITED STATES PATENTS

| 1,938,249 | 12/1933 | Fretter | 277—152 X |
| 2,076,747 | 4/1937 | Salisbury | 277—152 X |
| 2,509,118 | 5/1950 | Warren | 285—276 |
| 2,512,883 | 6/1950 | Warren | 285—276 X |
| 3,301,568 | 1/1967 | Perry | 285—277 X |

FOREIGN PATENTS

| 1,231,867 | 4/1960 | France. |
| 1,258,972 | 3/1961 | France. |

EDWARD C. ALLEN, *Primary Examiner.*

THOMAS F. CALLAGHAN, *Assistant Examiner.*